(12) United States Patent
Cailleteau

(10) Patent No.: US 9,796,296 B2
(45) Date of Patent: Oct. 24, 2017

(54) BASE FRAME ASSEMBLY FOR PASSENGER SEATS

(71) Applicant: Zodiac Seats France, Issoudun (FR)

(72) Inventor: Jeremy Cailleteau, St Aout (FR)

(73) Assignee: Zodiac Seats France, Issoudun (FR)

( * ) Notice: Subject to any disclaimer, the term of this patent is extended or adjusted under 35 U.S.C. 154(b) by 225 days.

(21) Appl. No.: 14/413,021

(22) PCT Filed: Jul. 8, 2013

(86) PCT No.: PCT/IB2013/055583
§ 371 (c)(1),
(2) Date: Jan. 6, 2015

(87) PCT Pub. No.: WO2013/144935
PCT Pub. Date: Oct. 3, 2013

(65) Prior Publication Data
US 2015/0202992 A1    Jul. 23, 2015

Related U.S. Application Data

(60) Provisional application No. 61/668,511, filed on Jul. 6, 2012.

(51) Int. Cl.
*B60N 2/01* (2006.01)
*B60N 2/04* (2006.01)
(Continued)

(52) U.S. Cl.
CPC ............... *B60N 2/01* (2013.01); *B60N 2/015* (2013.01); *B60N 2/04* (2013.01); *B60N 2/68* (2013.01);
(Continued)

(58) Field of Classification Search
CPC ............ B64D 11/0601; B64D 11/0604; B64D 11/0648; B64D 11/0696; B64D 11/06; B60N 2/01; B60N 2/015
See application file for complete search history.

(56) References Cited

U.S. PATENT DOCUMENTS 5,509,722 A * 4/1996 Beroth ............... B64D 11/0693
244/118.6
5,553,923 A * 9/1996 Bilezikjian ............ B64D 11/06
297/232
(Continued)

FOREIGN PATENT DOCUMENTS

| EP | 2403759 A2 | 1/2012 |
| WO | 03013903 A1 | 2/2003 |
| WO | 2004083035 A1 | 9/2004 |

OTHER PUBLICATIONS

International Patent Application No. PCT/IB2013/055583, International Preliminary Report on Patentability dated Jan. 15, 2015.
(Continued)

*Primary Examiner* — David R Dunn
*Assistant Examiner* — Tania Abraham
(74) *Attorney, Agent, or Firm* — Kilpatrick Townsend & Stockton LLP; Dean W. Russell; Kristin M. Crall

(57) ABSTRACT

Described are base frame assemblies (10) for a passenger seat including a main frame (12) with a seat support structure (16) and a lateral support structure (18), wherein the lateral support structure (18) includes two seat fittings (28), and the seat support structure includes one seat fitting (30), and a secondary frame (14) pivotally coupled to the main frame (16), wherein the secondary frame (14) includes one seat fitting (50). A passenger seat (20) and a surrounding monument (26) are mounted to the base frame assembly (10).

7 Claims, 16 Drawing Sheets

(51) Int. Cl.
  *B60N 2/68* (2006.01)
  *B64D 11/06* (2006.01)
  *B60N 2/015* (2006.01)

(52) U.S. Cl.
  CPC .......... *B64D 11/06* (2013.01); *B64D 11/0601* (2014.12); *B64D 11/0604* (2014.12); *B64D 11/0639* (2014.12); *B64D 11/0648* (2014.12); *B64D 11/0696* (2013.01); *Y02T 50/46* (2013.01)

(56) References Cited

U.S. PATENT DOCUMENTS

| | | | | |
|---|---|---|---|---|
| 5,992,798 | A * | 11/1999 | Ferry | A47C 1/0352 105/316 |
| 6,227,489 | B1 * | 5/2001 | Kitamoto | B64D 11/00 244/118.5 |
| 6,817,673 | B2 * | 11/2004 | Walker | B60N 2/002 297/440.2 |
| 7,159,937 | B2 * | 1/2007 | Williamson | B60N 2/01508 297/216.13 |
| 7,837,146 | B2 | 11/2010 | Bauer | |
| 8,087,612 | B2 * | 1/2012 | Park | B60N 2/015 244/118.5 |
| 2009/0050740 | A1 * | 2/2009 | Saint-Jalmes | B60N 2/0232 244/118.6 |
| 2009/0114794 | A1 * | 5/2009 | Rudduck | B60N 2/015 248/503.1 |
| 2010/0314494 | A1 * | 12/2010 | Gasser | B64D 11/0696 244/131 |
| 2013/0038103 | A1 * | 2/2013 | Scott | B64D 11/06 297/248 |

OTHER PUBLICATIONS

International Patent Application No. PCT/IB2013/055583, Invitation to Pay Additional Fees and, Where Applicable, Protest Fee and Partial Search Report dated Dec. 13, 2013.
International Patent Application No. PCT/IB2013/055583, International Search Report and Written Opinion dated Mar. 3, 2014.

* cited by examiner

BASE FRAME ASSEMBLY FOR PASSENGER SEATS

CROSS REFERENCE TO RELATED APPLICATIONS

This application is the U.S. national phase entry of International Application Ser. No. PCT/IB2013/055583, filed on Jul. 8, 2013, entitled BASE FRAME ASSEMBLY FOR PASSENGER SEATS ("the '583 application"), which application is related to and claims priority benefits from U.S. Provisional Application Ser. No. 61/668,511, filed on Jul. 6, 2012, entitled LOWER FRAME FOR HIGH END BUSINESS CALL SEAT UNIT FOR AIRCRAFT ("the '511 application"). The '583 and '511 applications are hereby incorporated herein in their entireties by this reference.

FIELD OF THE INVENTION

The invention relates to support structures for passenger seats and furniture installed in a vehicle cabin.

BACKGROUND

Common carriers, such as passenger airlines, bus lines, train lines, and passenger vehicles frequently include business class seating in which a monument is placed around a portion of the passenger seat to offer privacy, stowage, and support for a table, and a video monitor. Because the cabins of such vehicles traditionally include seat tracks in the floor that are aligned with the longitudinal direction of the vehicle, installation of seating and furniture at an angle to such tracks, while also complying with all necessary safety regulations presents a challenge.

Several solutions have been attempted to overcome this problem. For example, a double lower frame—one for the passenger seat and one for the surrounding monument—has been used to connect the seat and monument to the seat tracks, but the installation is complex and the number of frames needed may interfere with the available foot area for passengers.

A pallet or plinth on which the passenger seat and the monument are mounted has been used to connect the seat and monument to the seat tracks, but the design creates a floor level that is uneven with the cabin floor, thus presenting trip hazards for passengers moving about the cabin.

Finally, GB 2405790 describes a single lower frame on three points for connecting the seat and monument to the seat tracks, but does not provide a way to connect a footrest or other structures that may be used in conjunction with the monument and passenger seat.

Thus, it may be desirable to provide a base frame assembly for installing passenger seats, monuments, and other structures at an angle to the direction of seat tracks within a vehicle floor, in which the base frame assembly does not significantly interfere with passenger foot space or present tripping hazards.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of the present invention include a base frame assembly for a passenger seat comprising a main frame comprising a seat support structure and a lateral support structure, wherein the lateral support structure comprises two seat fittings, and the seat support structure comprises one seat fitting, and a secondary frame pivotally coupled to the main frame, wherein the secondary frame comprises one seat fitting. In certain embodiments, a passenger seat and a surrounding monument are mounted to the base frame assembly. A second seat support structure may also be pivotally coupled to the lateral support structure. The lateral support structure may be configured to have a length that approximates a combined width of the passenger seat and the surrounding monument, and the seat support structure may be configured to approximate a width of the passenger seat.

According to certain embodiments, the seat support structure and the lateral support structure are integrally formed as a single panel, and may further include a plurality of kinematic fittings coupled to an upper surface of the single panel and configured to couple to the passenger seat.

In some embodiments, the seat support structure comprises a pair of spars coupled to opposing sides of a panel, and a beam coupled to an end of each spar and positioned adjacent a third side of the panel, and the lateral support structure comprises a beam coupled to an opposing end of each spar and positioned adjacent a fourth side of the panel. Each spar may be coupled to the beams with a bridge mounting configuration. A plurality of furniture fittings may be coupled to the beams, wherein each furniture fitting is configured to couple to the surrounding monument.

In additional embodiments, the seat support structure comprises a plate, and the lateral support structure comprises a beam, and may further include a pair of sliding tracks coupled to an upper surface of the plate and configured to couple to a passenger seat.

According to some embodiments, the seat support structure comprises a box frame, and a beam coupled to an end of the box frame, and the lateral support structure comprises a beam coupled to an opposing end of the box frame.

Embodiments of the present invention also include a base frame assembly comprising a beam comprising a rectilinear circumferential shape, at least one seat fitting comprising a structure fitting coupled to a portion of a lower half of the beam, at least one furniture fitting comprising the structure fitting coupled to a portion of an upper half of the beam, and a panel comprising a plurality of the structure fittings coupled to a portion of the upper half of the beam, wherein each structure fitting is configured to have an inner shape that substantially conforms to no more than one-half of the rectilinear circumferential shape of the beam so that the structure fittings coupled to the portion of the upper half of the beam do not overlap with the structure fittings coupled to the portion of the lower half of the beam. The base frame assembly may further comprise a second beam, wherein the wherein the first beam is configured to have a length that approximates a combined width of a passenger seat and a surrounding monument, and the second beam is configured to have a length that approximates a width of the passenger seat. In certain embodiments, a passenger seat and a surrounding monument are mounted to the base frame assembly.

Embodiments of the present invention also include a passenger seat module comprising a base frame assembly comprising a main frame comprising a seat support structure and a lateral support structure, wherein the lateral support structure comprises two seat fittings, and the seat support structure comprises one seat fitting, and a secondary frame pivotally coupled to the main frame, wherein the secondary frame comprises one seat fitting, a passenger seat mounted to the base frame assembly, wherein the passenger seat comprises a back configured to fold forward into a substantially horizontal position, and a monument comprising an upper portion and a lower portion, wherein the lower portion is mounted to the base frame assembly, and the upper portion is releasably attached to the lower portion. The lower portion may be configured to have a height of approximately 20-25 inches. A second seat support structure may also be pivotally coupled to the lateral support structure. The lateral support structure may be configured to have a length that approximates a combined width of the passenger seat and the surrounding monument, and the seat support structure may be configured to approximate a width of the passenger seat.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide base frame assemblies for use with passenger seats and furniture. While the base frame assemblies are discussed for use with aircraft passenger seats, they are by no means so limited. Rather, the base frame assemblies may be used with other types of seats or structures of any type or otherwise as desired.

FIGS. 1-23 illustrate embodiments of a base frame assembly 10. In these embodiments, the base frame assembly 10 comprises a main frame 12 and a secondary frame 14. The main frame 12 and/or the secondary frame 14 may be formed of aluminum, other metallic materials, plastic materials, composite materials, or other suitable materials that provide a sufficient strength and stiffness, particularly to avoid warpage effects.

Figure 1:
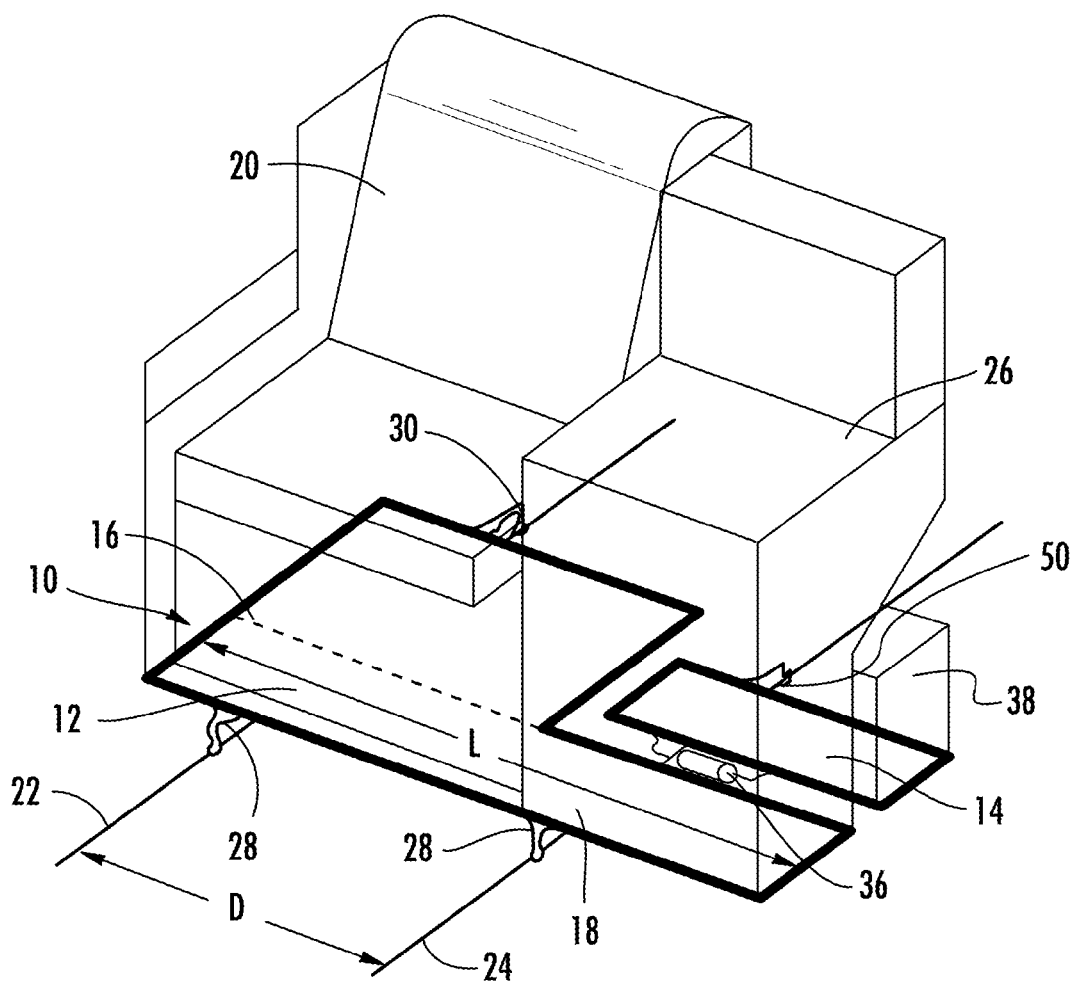
FIG. 1 is a front perspective view of a passenger seat module with a base frame assembly coupled to a passenger seat and a surrounding monument.
Figure 4:
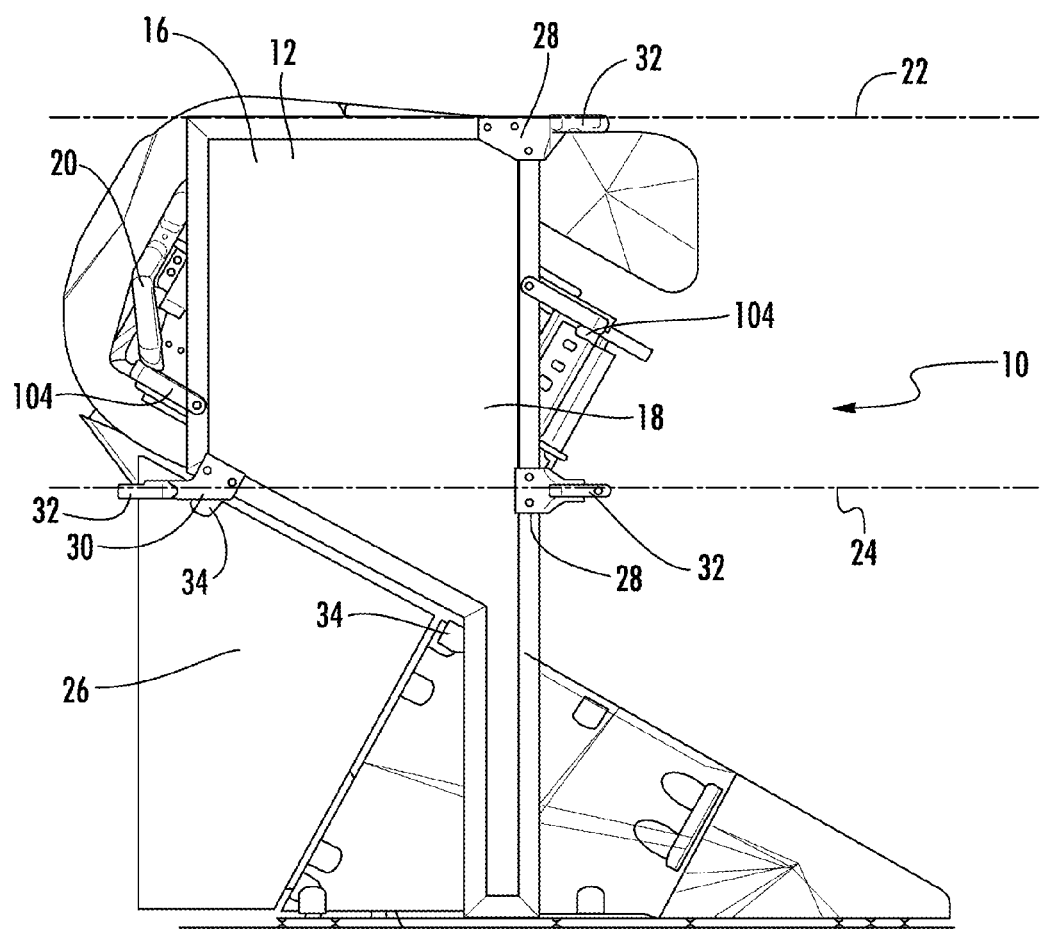
FIG. 4 is a bottom view of a passenger seat module with the main frame of FIG. 2.
Figure 7:
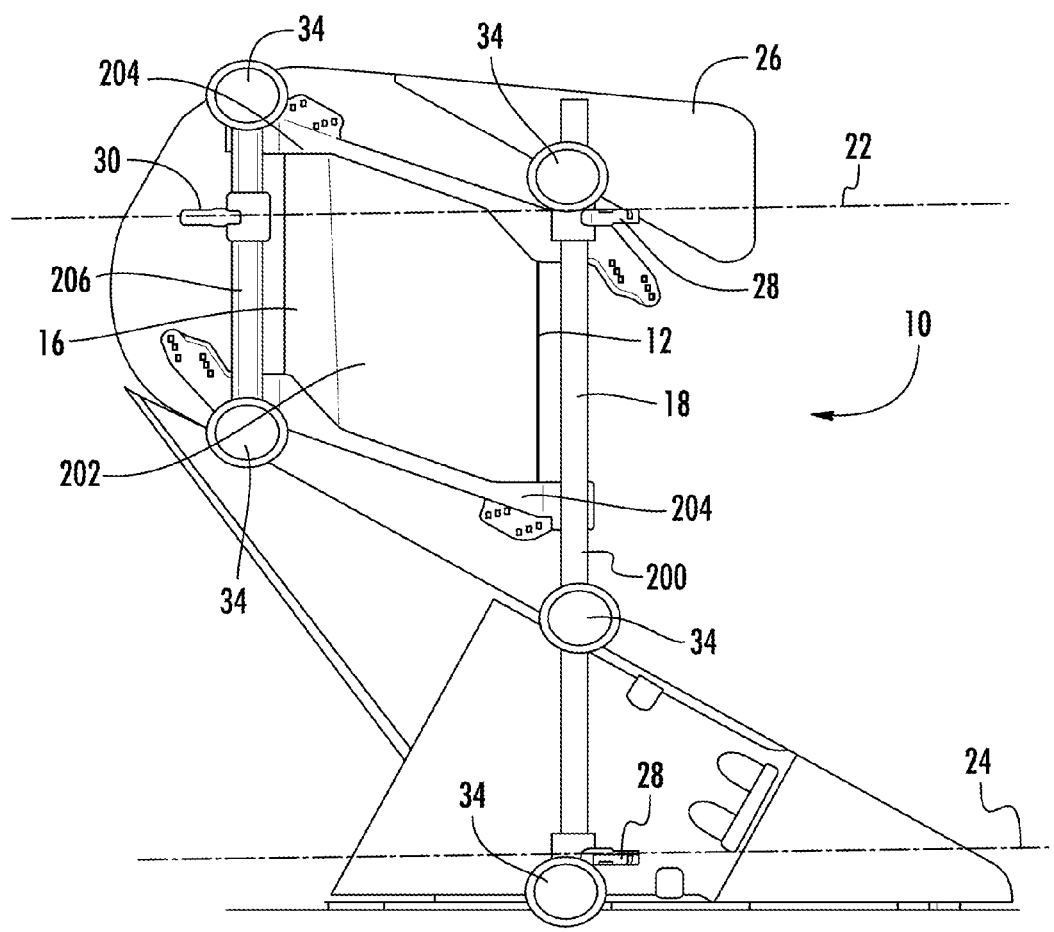
FIG. 7 is a bottom view of a passenger seat module with the main frame of FIG. 5.
Figure 17:
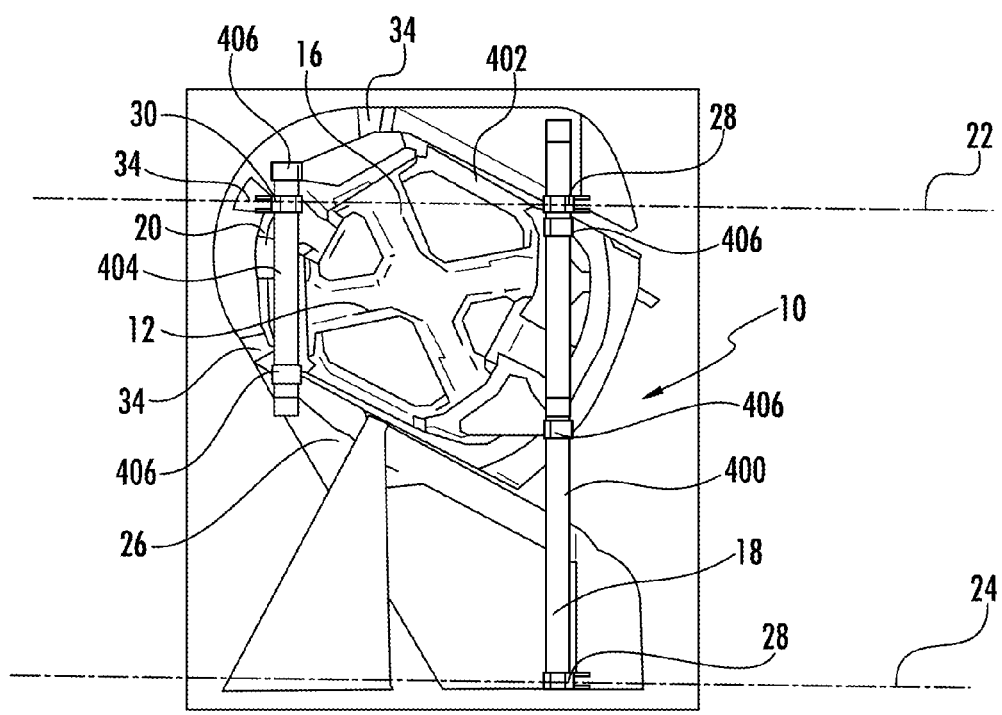
FIG. 17 is a bottom view of a passenger seat module with the main frame of FIG. 16.

The main frame 12 includes a seat support structure 16 and a lateral support structure 18. In certain embodiments, the seat support structure 16 is configured to be positioned below at least a substantial portion of a passenger seat 20, such that the seat support structure 16 is configured to approximate a width of the passenger seat 20. The lateral support structure 18 is configured to have a length L that at least corresponds to a distance D between two seat tracks 22, 24 located in a cabin floor of an aircraft or other vehicle, and may further be configured to have a length L that exceeds the distance D between the two seat tracks 22, 24. In some embodiments, as shown in FIGS. 1, 4, the distance D approximates a width of the passenger seat 20. In other embodiments, as shown in FIGS. 7, 17, the distance D approximates a combined width of the passenger seat 20 and a surrounding monument 26.

The lateral support structure 18 may be configured so that a central axis that corresponds to the direction of the length L is oriented generally perpendicular to a central axis of the two parallel seat tracks 22, 24. However, a person of ordinary skill in the relevant art will understand that the lateral support structure 18 may be oriented in any suitable direction relative to the seat tracks 22, 24 that provides a suitable structural stability and stiffness to withstand warpage effects when the passenger seat 20 and the monument 26 are coupled to the base frame assembly 10, and the base frame assembly 10 is coupled to the seat tracks 22, 24.

Figure 2:
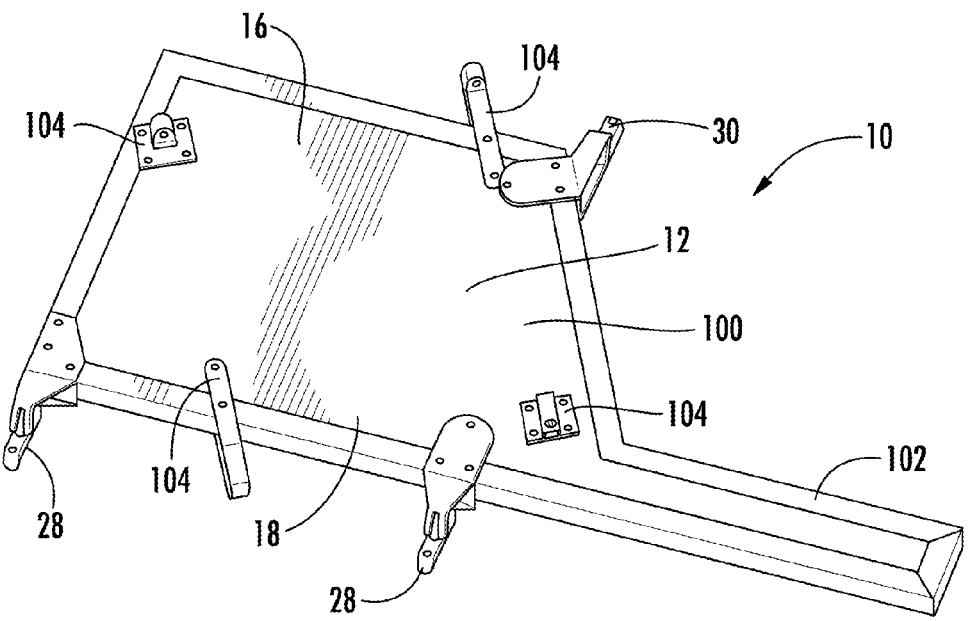
FIG. 2 is a top perspective view of a main frame of the base frame assembly of FIG. 1, according to certain embodiments of the present invention.
Figure 3:
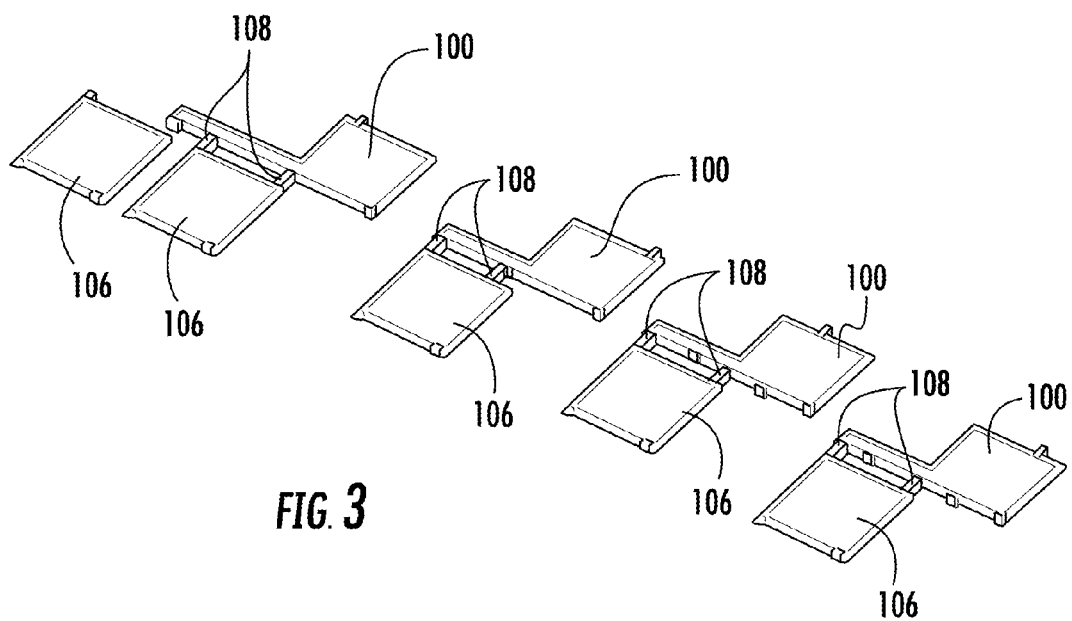
FIG. 3 is a top perspective view of a plurality of the main frames of FIG. 2 in a staggered arrangement, along with a second seat support structure coupled to each main frame.

In some embodiments, as best shown in FIGS. 2-4, the entire main frame 12 is integrally formed so that the structures 16, 18 form a single panel 100. A U-shaped channel 102 may be coupled to the edges of the panel 100 to provide additional rigidity to the panel 100. The panel 100 and/or the channel 102 may be formed of aluminum, other metallic materials, plastic materials, composite materials, or other suitable materials that provide a sufficient strength and stiffness, particularly to avoid warpage effects. In certain embodiments, the panel 100 may have an inner honeycomb design to further minimize the weight of the panel 100. The inner honeycomb design may be covered by a skin having approximately a 2 mm thickness, so that the entire thickness of the panel is approximately 30 mm. However, a person of ordinary skill in the relevant art will understand that any suitable panel structure, thickness, and weight may be used that provides a suitable structural stability and stiffness to withstand warpage effects when the passenger seat 20 and the monument 26 are coupled to the base frame assembly 10, and the base frame assembly 10 is coupled to the seat tracks 22, 24.

In these embodiments, as shown in FIGS. 2, 4, at least two seat fittings 28 are attached to the panel 100 in the region that corresponds to the location of lateral support structure 18, and at least one seat fitting 30 is attached to the panel 100 in the region that corresponds to the seat support structure 16. The at least two seat fittings 28 may be positioned in any suitable location along the central axis of the lateral support structure 18 that aligns with the location of the seat tracks 22, 24, and the at least one seat fitting 30 may be positioned in any suitable location along the surface of the seat support structure 16 that aligns with the location of one of the seat tracks 22, 24. The seat fittings 28, 30 may be attached to the panel 100 via rivets, screws, or other suitable mechanical or chemical fasteners. The seat fittings 28, 30 are then attached to the seat tracks 22, 24 via studs 32.

As illustrated in FIG. 2, kinematic fittings 104 are attached to the seat support structure 16 and configured to couple to the passenger seat 20. The kinematic fittings 104 may be located in any suitable location on the seat support structure 16 that aligns with corresponding coupling locations on the passenger seat 20 when the passenger seat 20 is positioned in the desired location and orientation above the seat support structure 16. The kinematic fittings 104 may be attached to the panel 100 via rivets, screws, or other suitable mechanical or chemical fasteners. The passenger seat 20 may then be attached to the kinematic fittings 104 via rivets, screws, or other suitable mechanical or chemical fasteners.

Furniture fittings 34 are attached to the lateral support structure 18 and/or seat support structure 16 and configured to couple to the surrounding monument 26. The furniture fittings 34 may be located in any suitable location that aligns with the corresponding coupling locations on the monument 26 when the monument 26 is positioned in the desired location and orientation above and/or adjacent the lateral support structure 18 and/or the seat support structure 16. The furniture fittings 34 may be attached to the panel 100 via rivets, screws, or other suitable mechanical or chemical fasteners.

In certain embodiments, a panel 106 may be coupled to the panel 100 so that the base frame assembly 10 may be implemented in a staggered module, as shown in FIG. 3. In these embodiments, the additional panel 106 is coupled to the panel 100 in a location so as to extend below a substantial portion of a second passenger seat 20 that is positioned adjacent the first passenger seat 20. One of ordinary skill in the relevant art will understand that any suitable arrangement between the panels 100 and 106 may be used as needed to achieve the desired staggered arrangement. The panel 106 may be formed of the same or different materials as panel 100, and may have a shape similar to that of the seat support structure 16 portion of the panel 100 or may have a different shape as needed to achieve a suitable structural stability and stiffness that will withstand warpage effects when the two passenger seats 20 and the monument 26 are coupled to the base frame assembly 10, and the base frame assembly 10 is coupled to the seat tracks 22, 24.

The additional panel 106 may coupled to the panel 100 via a pivot coupling 108. The pivot coupling 108 is oriented generally perpendicular to the central axis of the seat tracks 22, 24 and generally parallel to a plane that crosses the seat tracks 22, 24. The orientation of the pivot coupling 108 effectively locks the panel 106 to the panel 100 when the base frame assembly 10 is coupled to the seat tracks 22, 24.

By forming the main frame 12 as an integral panel 100, such a design would limit the panel size, thereby reducing weight and costs, and would provide a large area below the seat 20 to place all boxes (such as in-flight entertainment components, etc.) within easy access. In some embodiments, multiple panels 100 may be required for specific seat installation configurations.

In some embodiments, as illustrated in FIGS. 5-11, the entire main frame 12 is formed so that the seat support structure 16 is a separate structure from lateral support structure 18. In these embodiments, the lateral support structure 18 may be a beam 200. In some embodiments, the beam 200 may have dimensions of approximately 50 mm by approximately 40 mm. The beam 200 may be formed of aluminum, other metallic materials, plastic materials, composite materials, or other suitable materials, and may further have a rectangular, circular, square, elliptical, "I" or other suitable cross-sectional shape as needed to provide a sufficient strength and stiffness, particularly to avoid warpage effects when the passenger seat 20 and the monument 26 are coupled to the base frame assembly 10, and the base frame assembly 10 is coupled to the seat tracks 22, 24.

In these embodiments, the seat support structure 16 comprises a panel 202, a pair of spars 204, and a second beam 206. The second beam 206 may be formed of the same materials, shape, and components as the beam 200, or may be formed of different materials, shapes, and/or components as needed to achieve a suitable structural stability and stiffness that will withstand warpage effects when the two passenger seats 20 and the monument 26 are coupled to the base frame assembly 10, and the base frame assembly 10 is coupled to the seat tracks 22, 24.

In these embodiments, the panel 202 may be formed of aluminum, other metallic materials, plastic materials, composite materials, or other suitable materials, and may further have a diamond, square, rectangular, circular, or other suitable shape. In certain embodiments, the panel 202 may have an inner honeycomb design to further minimize the weight of the panel 202. The inner honeycomb design may be covered by a skin having approximately a 2 mm thickness, so that the entire thickness of the panel is approximately 40 mm. However, a person of ordinary skill in the relevant art will understand that any suitable panel structure, thickness, and weight may be used that provides a suitable structural stability and stiffness to withstand warpage effects when the passenger seat 20 and the monument 26 are coupled to the base frame assembly 10, and the base frame assembly 10 is coupled to the seat tracks 22, 24.

Each spar 204 includes a U-shaped channel 208 that is configured to receive an edge of the panel 202. Each spar 204 may be configured so that the ends of the channel 208 are deeper in order to reduce corner stress on the panel 202 by providing more support for the corners of the panel 202. Each spar 204 further includes a pair of recesses 210, 212 positioned at each end of the channel 208. The recess 210 is configured to fit around a portion of the beam 200, and the recess 212 is configured to fit around a portion of the beam 206. As a result, the main frame 12 is formed when the panel 202 is inserted within the channels 208 of the spars 204, the recesses 210 of each spar 204 are fitted around a portion of the beam 200 and coupled thereto, and the recesses 212 of each spar are fitted around a portion of the beam 206 and coupled thereto. The panel 202 may be held in place within the channels 208 of the spars 204 when the spars 204 are coupled to the beams 200, 206 or may be coupled directly to the spars 204 via rivets, screws, or other suitable mechanical or chemical fasteners. The recesses 210, 212 may be configured as bridge mounting connections, so that the spars 204 may be coupled to an upper half of the beams 200, 206 with a bridge mounting and screw so as to prevent any interference with the positioning of seat fittings 28, 30 along a lower half of the beams 200, 206, which is described in more detail below. However, a person of ordinary skill in the relevant art will understand that the spars 204 may be attached to the beams 200, 206 via rivets, screws, or other suitable mechanical or chemical fasteners.

Figure 5:
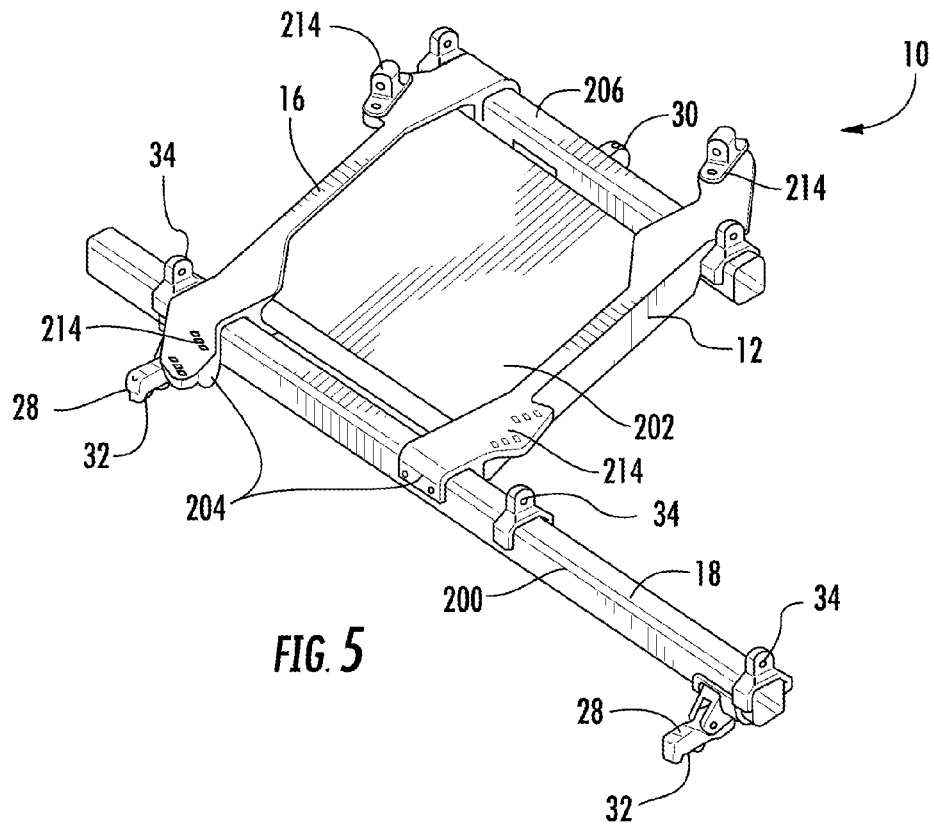
FIG. 5 is a top perspective view of a main frame of the base frame assembly of FIG. 1, according to certain embodiments of the present invention.
Figure 8:
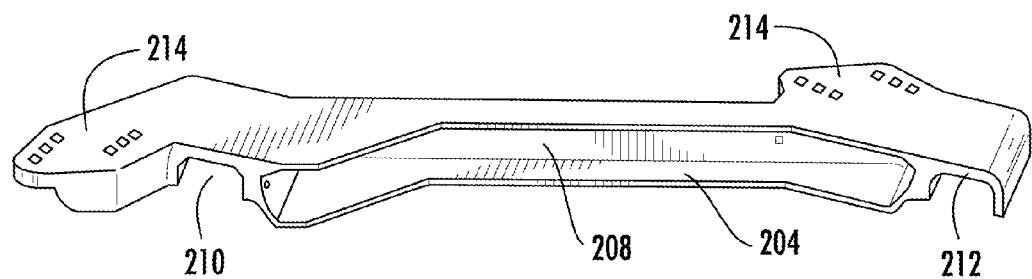
FIG. 8 is a perspective view of a spar of the main frame of FIG. 5.

As illustrated in FIGS. 5, 8, each end of the spars 204 include a plurality of apertures 214 to allow for the passenger seat 20 to couple to the spars 204 in a variety of angles. Furthermore, the spars 204 may have a reversible design so that each spar 204 may be coupled to either side of the panel 202. The passenger seat 20 may then be attached to the apertures 214 via rivets, screws, or other suitable mechanical or chemical fasteners.

In these embodiments, as shown in FIGS. 5, 7, at least two seat fittings 28 are attached to the beam 200, and at least one seat fitting 30 is attached to the beam 206. The at least two seat fittings 28 may be located in any suitable location along the beam 200 that aligns with the location of the seat tracks 22, 24, and the at least one seat fitting 30 may be located in any suitable location along the beam 206 that aligns with the location of one of the seat tracks 22, 24. The seat fittings 28, 30 may be coupled to a lower half of the beams 200, 206 with a bridge mounting and screw so as to prevent any interference with the positioning of the spars 204 and the furniture fittings 34 along the upper half of the beams 200, 206, which is described in more detail below. One of ordinary skill in the relevant art will understand that the seat fittings 28, 30 may be attached to the beams 200, 206 via rivets, screws, or other suitable mechanical or chemical fasteners. The seat fittings 28, 30 are then attached to the seat tracks 22, 24 via studs 32.

The furniture fittings 34 are attached to the beams 200, 206 and configured to couple to the surrounding monument 26. The furniture fittings 34 may be located in any suitable location that aligns with the corresponding coupling locations on the monument 26 when the monument 26 is positioned in the desired location and orientation above and/or adjacent the beams 200, 206. The furniture fittings 34 may be coupled to the upper half of the beams 200, 206 with a bridge mounting and screw so as to prevent any interference with the positioning of seat fittings 28, 30 along the lower half of the beams 200, 206, which is described in more detail below. However, a person of ordinary skill in the relevant art will understand that the furniture fittings 34 may be attached to the beams 200, 206 via rivets, screws, or other suitable mechanical or chemical fasteners. By attaching the monument 26 on several points on the beams 200, 206 (as illustrated in FIG. 7) with a bridge system and with a screw through silenbloc, the strain on the monument 26 is reduced.

Figure 9:
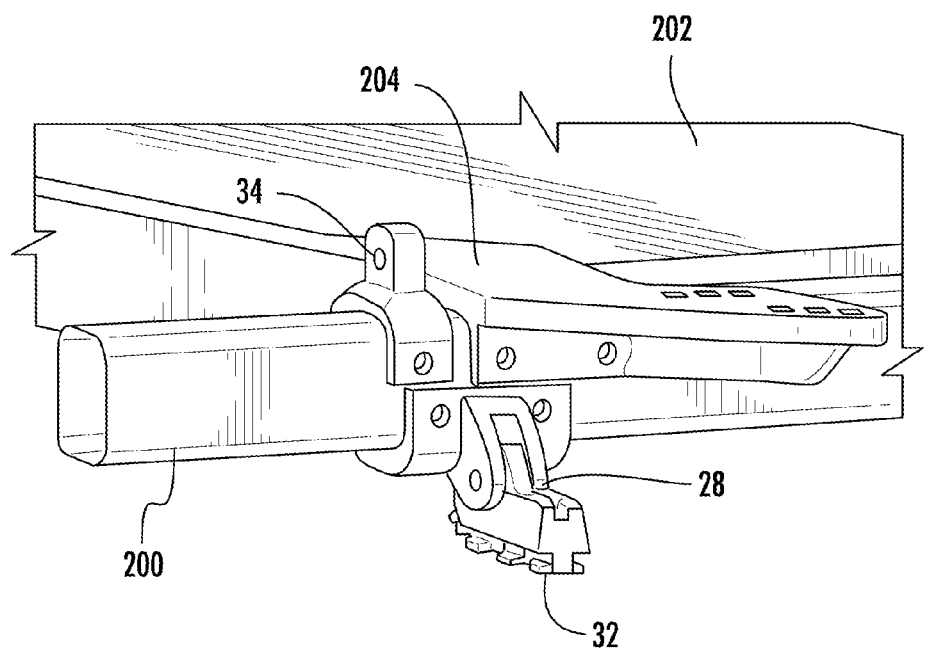
FIG. 9 is a partial perspective view of a spar, a beam, a furniture fitting, and a seat fitting of the main frame of FIG. 5.
Figure 10:
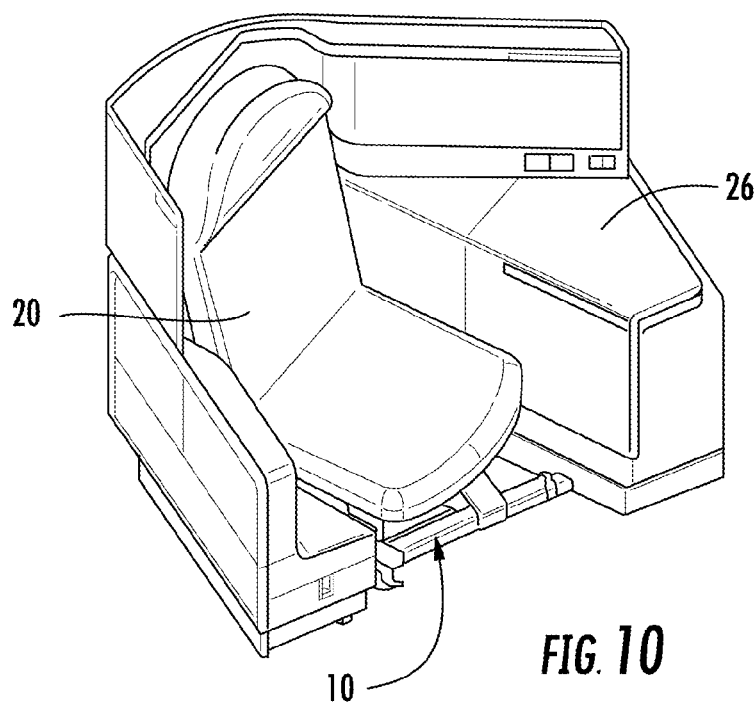
FIG. 10 is a front perspective view of a passenger seat module with the main frame of FIG. 5.
Figure 11:
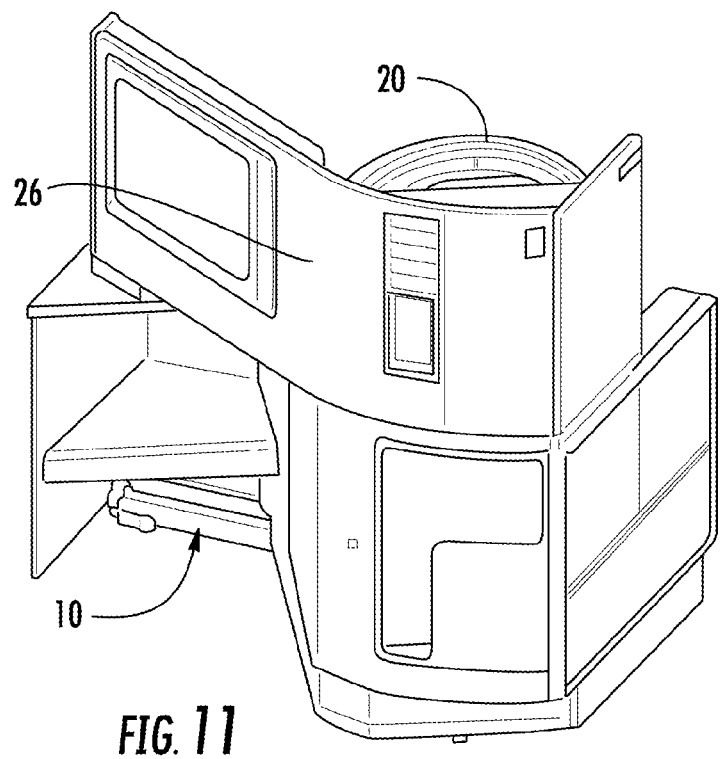
FIG. 11 is a rear perspective view of a passenger seat module with the main frame of FIG. 5.

Specifically, as illustrated in FIG. 9, the bridge mounting connections of the spars 204, furniture fittings 34, and seat fittings 28, 30 are configured have an inner shape that substantially conforms to no more than one-half of the circumferential shape of the beams 200, 206. The rectangular shape of the beams 200, 206 and the fitted U-shape of the bridge mounting connections are configured to prevent rotation of the connections about the beams 200, 206. Furthermore, because bridge mounting connections are configured to not to extend over more than one-half of the surface of the beams 200, 206, the bridge mounting connections on the lower half of the beams 200, 206 may be positioned along the beams 200, 206 without overlapping or interfering with any of the bridge mounting connections positioned on the upper half of the beams 200, 206 and vice versa. As a result, the seat fittings 28, 30 may be connected to the beams 200, 206 in any location regardless of the coupling locations of the spars 204 and furniture fittings 34.

Figure 6:
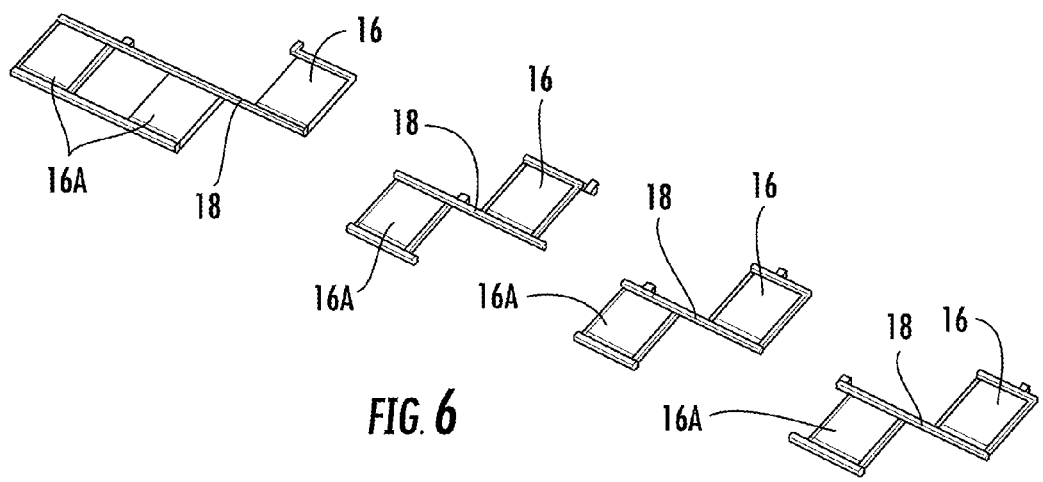
FIG. 6 is a top perspective view of a plurality of the main frames of FIG. 5 in a staggered arrangement, along with a second seat support structure coupled to each main frame.

In certain embodiments, a second seat support structure 16A may be coupled to the beam 200 so that the base frame assembly 10 may be implemented in a staggered module, as shown in FIG. 6. In these embodiments, the second seat support structure 16A is coupled to the beam 200 in a location so as to extend below a substantial portion of a second passenger seat 20 that is positioned adjacent the first passenger seat 20. One of ordinary skill in the relevant art will understand that any suitable arrangement between the seat support structure 16, 16A and the beam 200 may be used as needed to achieve the desired staggered arrangement. The second seat support structure 16A may be formed of the same materials, shape, and components as the seat support structure 16, or may be formed of different materials, shapes, and/or components as needed to achieve a suitable structural stability and stiffness that will withstand warpage effects when the two passenger seats 20 and the monument 26 are coupled to the base frame assembly 10, and the base frame assembly 10 is coupled to the seat tracks 22, 24.

By using the panel 202, spars 204, and beams 200, 206, such a design would limit the panel size, thereby reducing weight and costs, and would provide a large area below the seat 20 to place all boxes (such as in-flight entertainment components, etc.) within easy access. The single panel 202 and spars 204 may be used for all configurations and attachments to the beams 200, 206, thereby also simplifying production. In some embodiments, the thicker dimension of the base frame assembly 10 (i.e. when the beam 200 and/or the beam 202 has a dimension of 50 mm) may require additional room in the cabin.

In some embodiments, as illustrated in FIGS. 12-15, the entire main frame 12 is formed so that the seat support structure 16 is a separate structure from lateral support structure 18. In these embodiments, the lateral support structure 18 may be a beam 300. The beam 300 may be formed of aluminum, other metallic materials, plastic materials, composite materials, or other suitable materials, and may further have a rectangular, circular, square, elliptical, "I" or other suitable cross-sectional shape as needed to provide a sufficient strength and stiffness, particularly to avoid warpage effects when the passenger seat 20 and the monument 26 are coupled to the base frame assembly 10, and the base frame assembly 10 is coupled to the seat tracks 22, 24.

In these embodiments, the seat support structure 16 comprises a plate 302, a pair of coupling projections 304, and a third coupling projection 306.

In certain embodiments, the plate 302 may be formed of aluminum, other metallic materials, plastic materials, composite materials, or other suitable materials, and may further have a diamond, square, rectangular, circular, or other suitable shape. A person of ordinary skill in the relevant art will understand that any suitable plate structure, thickness, and weight may be used that provides a suitable structural stability and stiffness to withstand warpage effects when the passenger seat 20 and the monument 26 are coupled to the base frame assembly 10, and the base frame assembly 10 is coupled to the seat tracks 22, 24.

The pair of coupling projections 304 may be positioned on a lower surface 308 of the plate 302 in locations that are configured to couple to the beam 300, and may be coupled to the beam 300 via rivets, screws, or other suitable mechanical or chemical fasteners.

Figure 12:
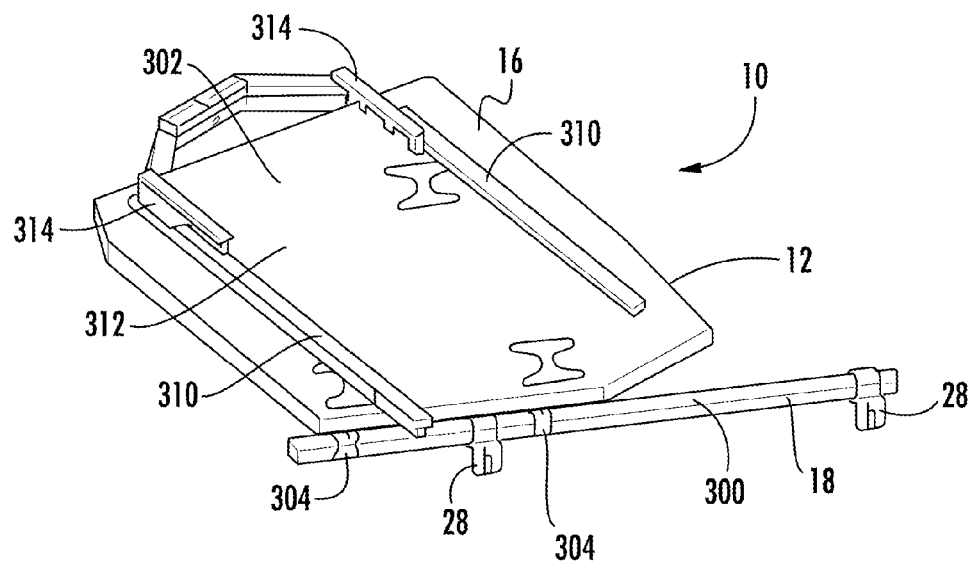
FIG. 12 is a top perspective view of a main frame of the base frame assembly of FIG. 1, according to certain embodiments of the present invention.
Figure 13:
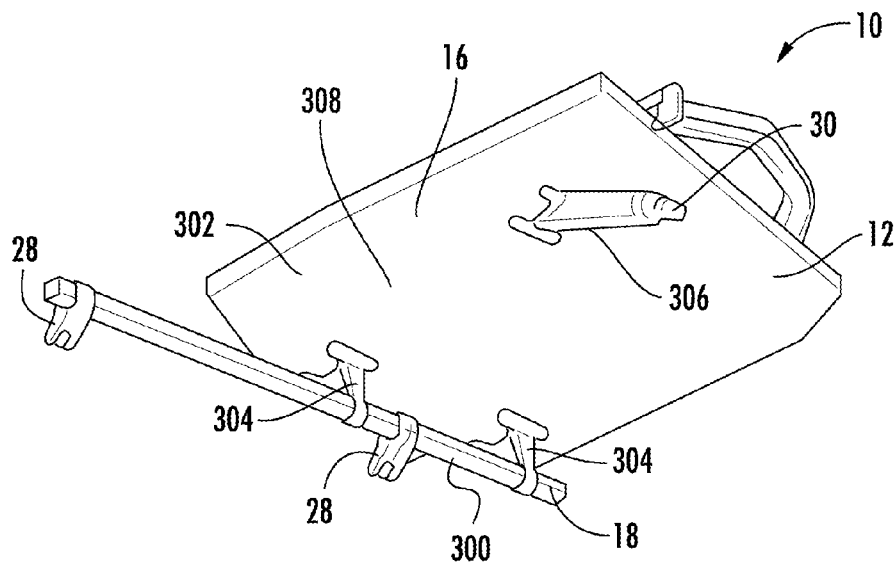
FIG. 13 is a bottom perspective view of the main frame of FIG. 12.
Figure 14:
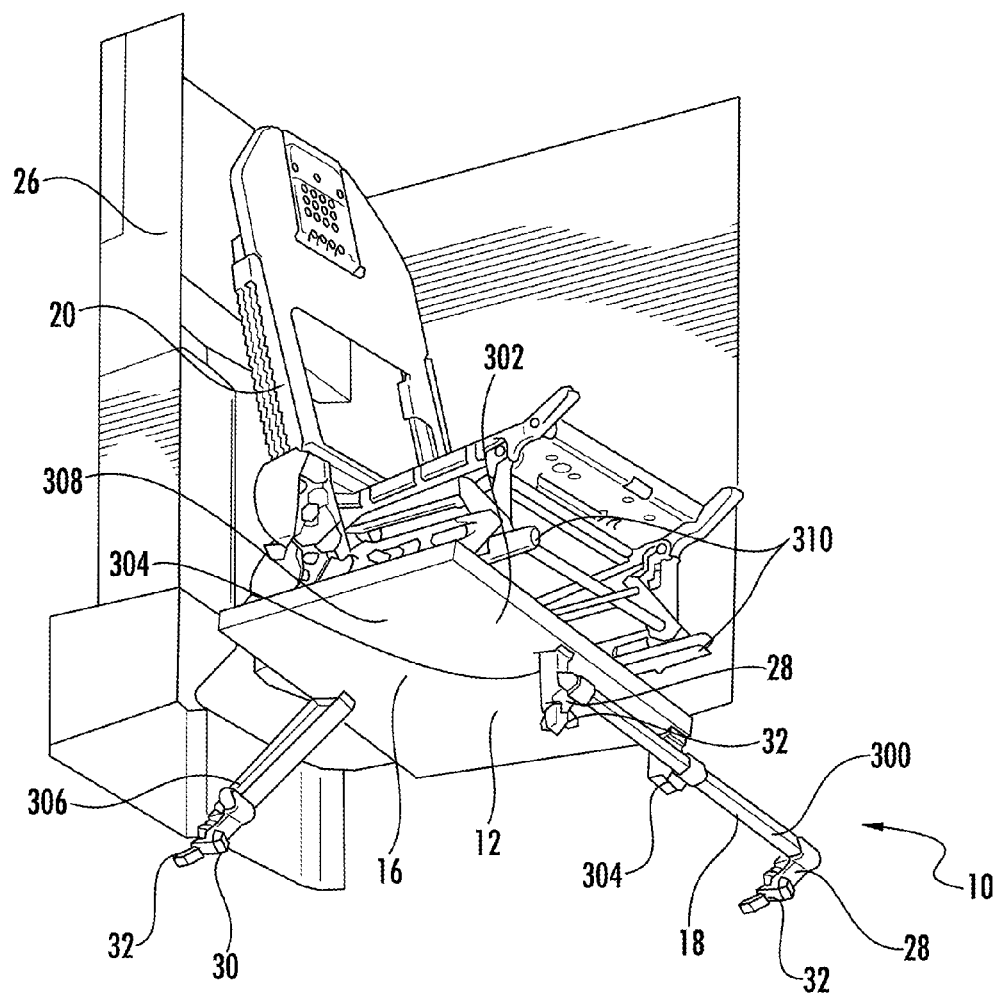
FIG. 14 is a bottom perspective view of a passenger seat module with the main frame of FIG. 12.
Figure 15:
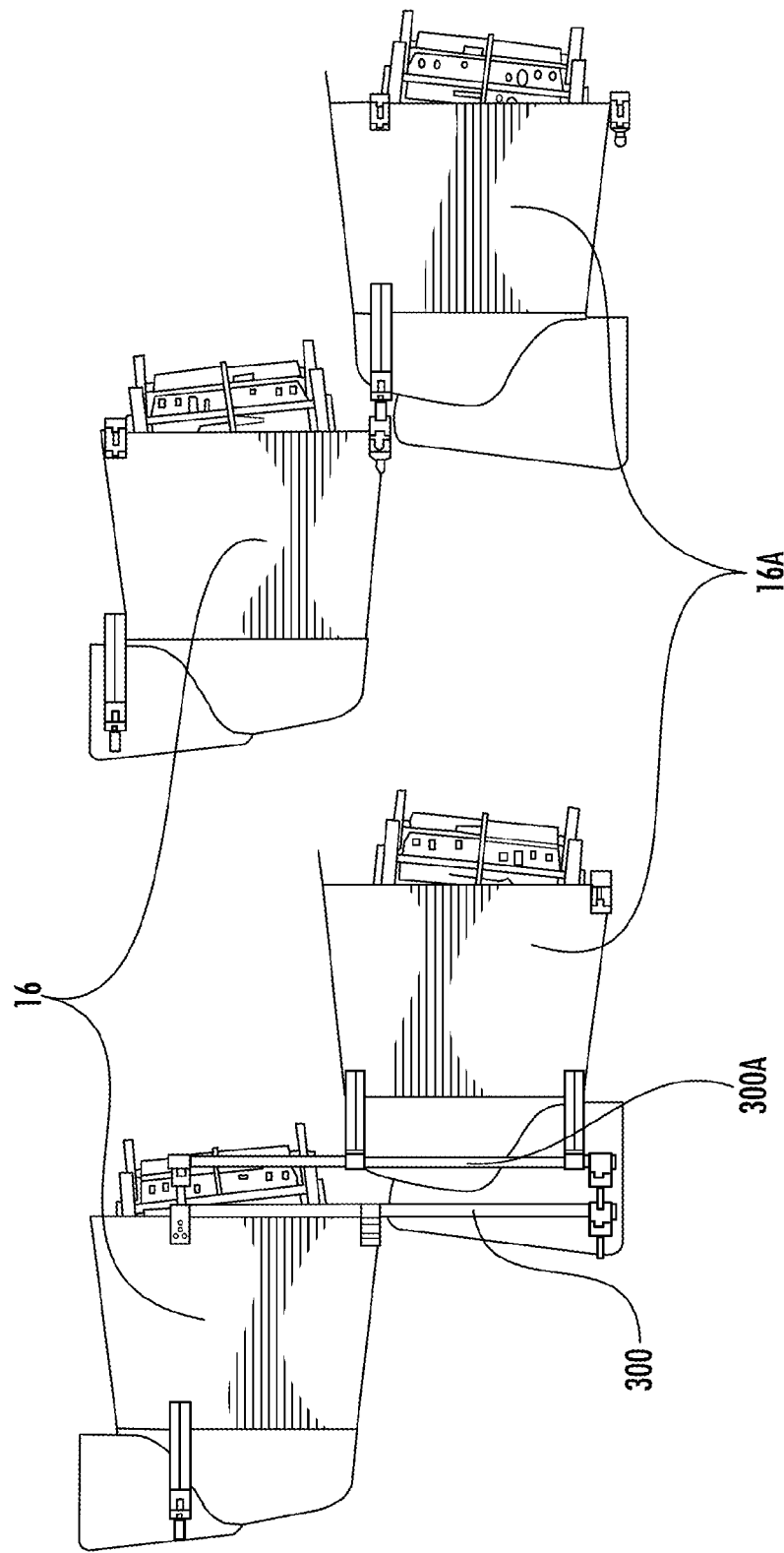
FIG. 15 is a bottom view of a plurality of passenger seat modules with the main frames of FIG. 12 in a staggered arrangement.

In these embodiments, as shown in FIGS. 12-13, 15, at least two seat fittings 28 are attached to the beam 300, and at least one seat fitting 30 is attached to the coupling projection 306. The at least two seat fittings 28 may be located in any suitable location along the beam 300 that aligns with the location of the seat tracks 22, 24, and the at least one coupling projection 306 may be located in any suitable location along the lower surface 308 of the plate 302 that aligns with the location of one of the seat tracks 22, 24. The seat fittings 28, 30 may be attached to the beam 300 and the coupling projection 306 via rivets, screws, or other suitable mechanical or chemical fasteners. The seat fittings 28, 30 are then attached to the seat tracks 22, 24 via studs 32.

A pair of sliding tracks 310 are attached to an upper surface 312 of the plate 302. The passenger seat 20 is then coupled directly to the sliding tracks 310. Inclusion of the sliding tracks 310 directly on the plate 302 may improve the sliding operation of the passenger seat 20. In certain embodiments, a tracking actuator 314 is also coupled to the plate 302 for suppression of the cross-piece.

The surrounding monument 26 may be coupled directly to the plate 302 via any suitable mechanical or chemical fasteners.

In certain embodiments, a second seat support structure 16A may be coupled to a second beam 300A so that the base frame assembly 10 may be implemented in a staggered module, as shown in FIG. 15. In these embodiments, the beam 300A may be positioned forward of the beam 300, and the second seat support structure 16A may be coupled to the beam 300A in an orientation that mirrors the positioning of the seat support structure 16 and beam 300. For example, as illustrated in FIG. 15, the seat support structure 16 is located aft and to the right end of the beam 300, and the seat support structure 16A is located forward and to the left end of the beam 300A. One of ordinary skill in the relevant art will understand that any suitable arrangement between the seat support structure 16, 16A and the beams 300, 300A may be used as needed to achieve the desired staggered arrangement, including but not limited to having both seat support structure 16, 16A coupled to the beam 300. In yet other embodiments, as shown in FIG. 15, the seat support structure 16, 16A may be connected directly to the seat tracks 22, 24 without the use of the beams 300, 300A. The second seat support structure 16A may be formed of the same materials, shape, and components as the seat support structure 16, or may be formed of different materials, shapes, and/or components as needed to achieve a suitable structural stability and stiffness that will withstand warpage effects when the two passenger seats 20 and the monument 26 are coupled to the base frame assembly 10, and the base frame assembly 10 is coupled to the seat tracks 22, 24.

By using the plate 302 and beam 300, such a design would limit the plate size, thereby reducing weight and costs. The boxes (such as in-flight entertainment components, etc.) may be placed below the seat area, but access to the boxes below the plate 302 may require removal of armrests and/or a rear panel. In some embodiments, multiple plates 302 may be required for specific seat installation configurations, and large leg and beam configurations could increase the complexity of production.

In some embodiments, as illustrated in FIGS. 16-20, the entire main frame 12 is formed so that the seat support structure 16 is a separate structure from lateral support structure 18. In these embodiments, the lateral support structure 18 may be a beam 400. In some embodiments, the beam 400 may be formed of aluminum, other metallic materials, plastic materials, composite materials, or other suitable materials, and may further have a rectangular, circular, square, elliptical, "I" or other suitable cross-sectional shape as needed to provide a sufficient strength and stiffness, particularly to avoid warpage effects when the passenger seat 20 and the monument 26 are coupled to the base frame assembly 10, and the base frame assembly 10 is coupled to the seat tracks 22, 24.

In these embodiments, the seat support structure 16 comprises a box frame 402, and a second beam 404. The second beam 404 may be formed of the same materials, shape, and components as the beam 400, or may be formed of different materials, shapes, and/or components as needed to achieve a suitable structural stability and stiffness that will withstand warpage effects when the two passenger seats 20 and the monument 26 are coupled to the base frame assembly 10, and the base frame assembly 10 is coupled to the seat tracks 22, 24.

In certain embodiments, the box frame 402 may be formed of aluminum, other metallic materials, plastic materials, composite materials, or other suitable materials, and may further have a diamond, square, rectangular, circular, or other suitable shape. A person of ordinary skill in the relevant art will understand that any suitable box frame structure, thickness, and weight may be used that provides a suitable structural stability and stiffness to withstand warpage effects when the passenger seat 20 and the monument 26 are coupled to the base frame assembly 10, and the base frame assembly 10 is coupled to the seat tracks 22, 24.

Coupling projections 406 may be positioned along the edges of the box frame 402 in locations that are configured to couple to the beams 400, 404, and may be coupled to the beams 400, 404 via rivets, screws, or other suitable mechanical or chemical fasteners.

Figure 16:
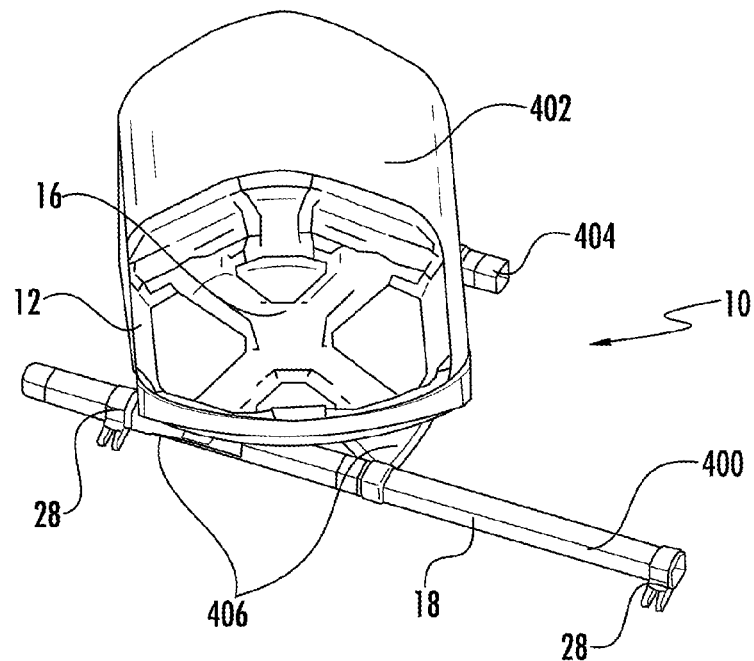
FIG. 16 is a top perspective view of a main frame of the base frame assembly of FIG. 1, according to certain embodiments of the present invention.
Figure 18:
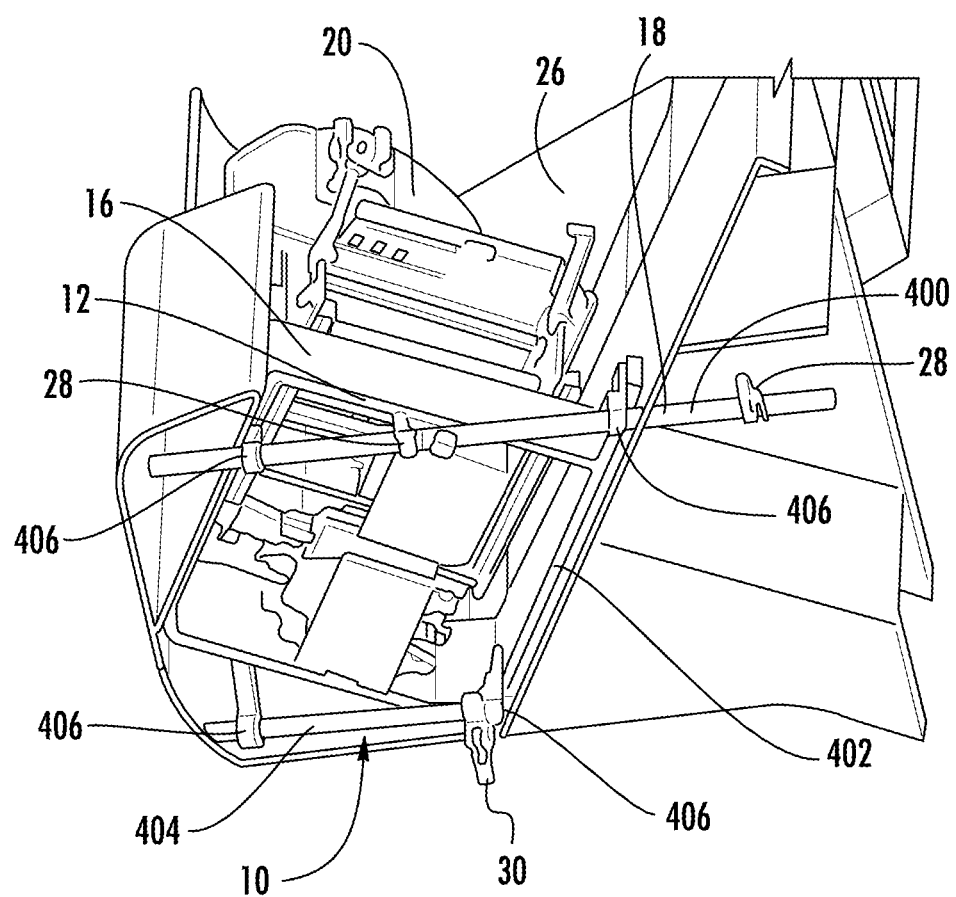
FIG. 18 is a bottom perspective view of a passenger seat module with the main frame of FIG. 16.
Figure 19:
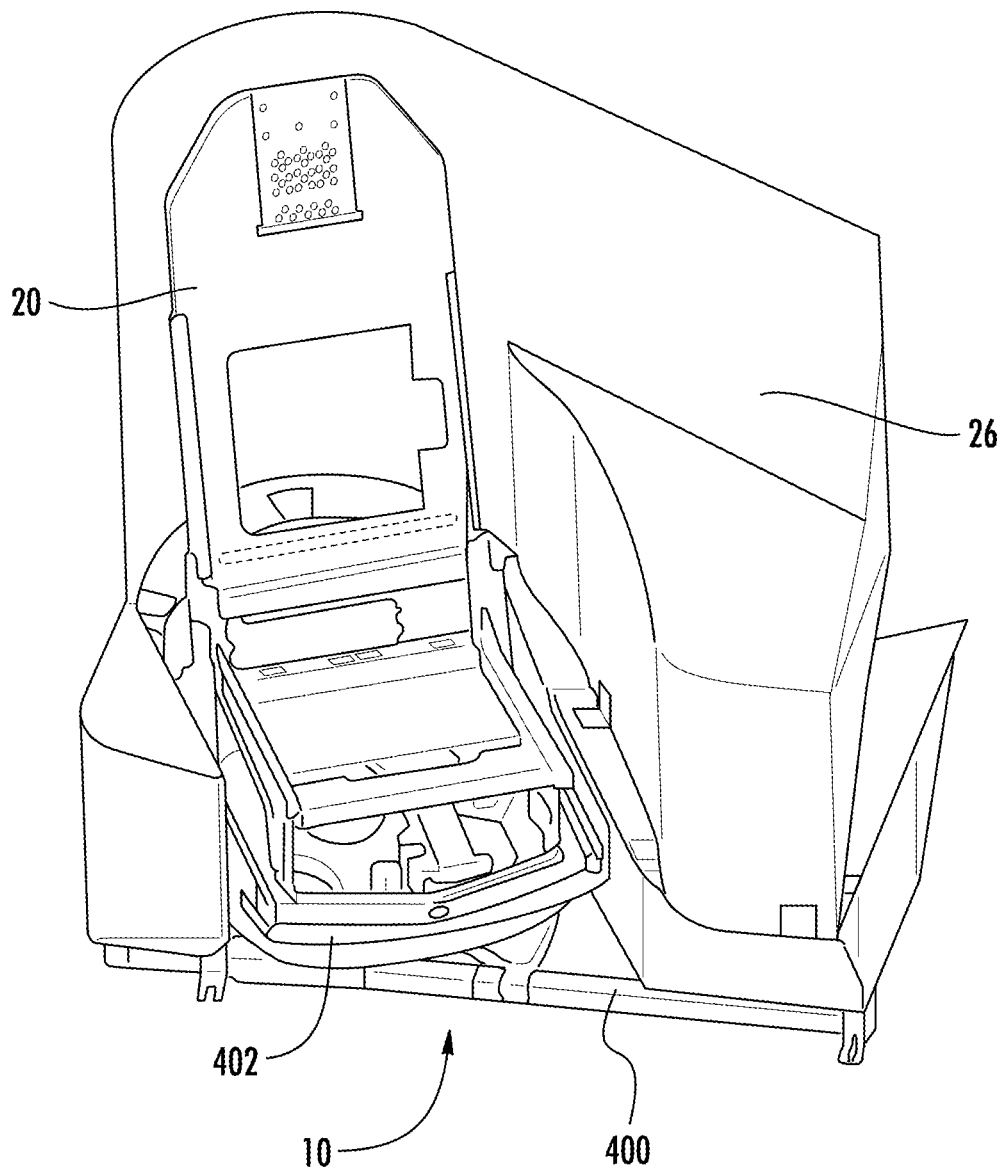
FIG. 19 is a top perspective view of a passenger seat module with the main frame of FIG. 16.

In these embodiments, as shown in FIGS. 16-18, at least two seat fittings 28 are attached to the beam 400, and at least one seat fitting 30 is attached to the beam 404. The at least two seat fittings 28 may be located in any suitable location along the beam 400 that aligns with the location of the seat tracks 22, 24, and the at least one seat fitting 30 may be located in any suitable location along the beam 404 that aligns with the location of one of the seat tracks 22, 24. The seat fittings 28, 30 may be attached to the beams 400, 404 via rivets, screws, or other suitable mechanical or chemical fasteners. The seat fittings 28, 30 are then attached to the seat tracks 22, 24 via studs 32.

The passenger seat 20 is then attached to the box frame 402 via any suitable mechanical fasteners in a manner that will withstand warpage effects when the passenger seat 20 and the monument 26 are coupled to the base frame assembly 10, and the base frame assembly 10 is coupled to the seat tracks 22, 24.

Furniture fittings 34 are attached to the beams 400, 404 and configured to couple to the surrounding monument 26. The furniture fittings 34 may be located in any suitable location that aligns with the corresponding coupling locations on the monument 26 when the monument 26 is positioned in the desired location and orientation above and/or adjacent the beams 400, 404. The furniture fittings 34 may be coupled to the beams 400, 404 via any suitable mechanical or chemical fasteners.

Figure 20:
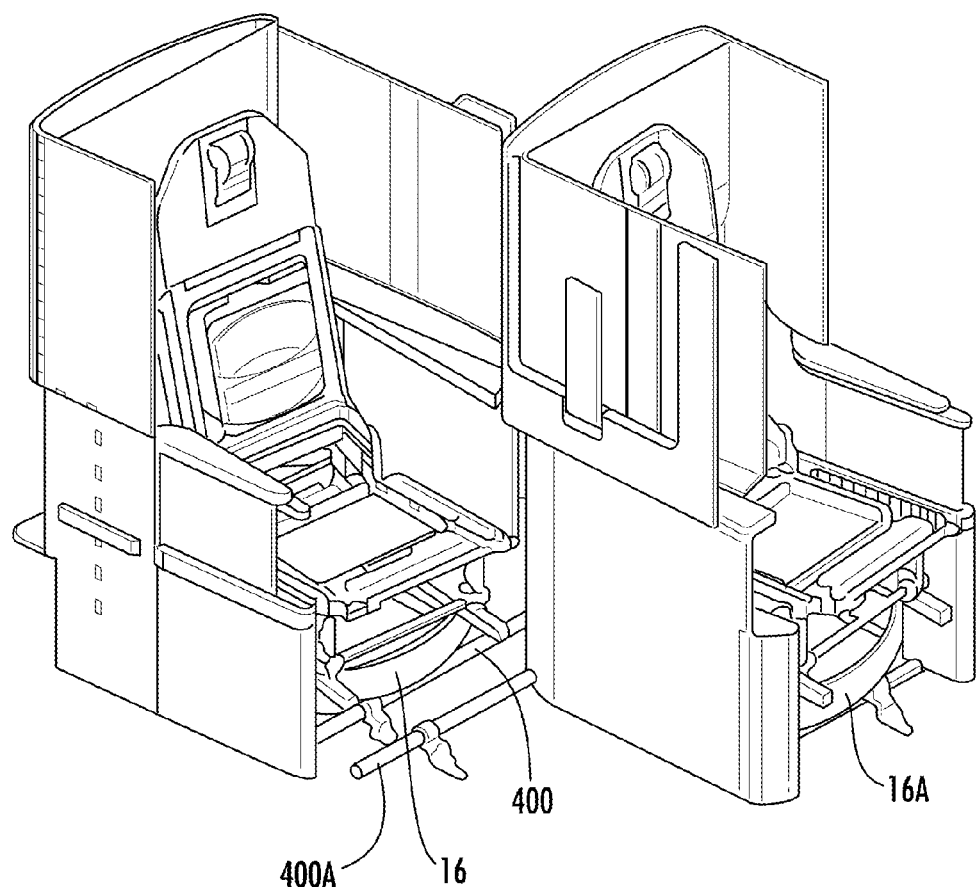
FIG. 20 is a front perspective view of a plurality of passenger seat modules with the main frames of FIG. 16 in a staggered arrangement.

In certain embodiments, a second seat support structure 16A may be coupled to an additional beam 400A so that the base frame assembly 10 may be implemented in a staggered module, as shown in FIG. 20. In these embodiments, the beam 400A may be positioned forward of the beam 400, and the second seat support structure 16A may be coupled to the beam 400A in an orientation that mirrors the positioning of the seat support structure 16 and beam 400. For example, as illustrated in FIG. 20, the seat support structure 16 is located aft and to the left end of the beam 400, and the seat support structure 16A is located forward and to the right end of the beam 400A. One of ordinary skill in the relevant art will understand that any suitable arrangement between the seat support structure 16, 16A and the beams 400, 400A may be used as needed to achieve the desired staggered arrangement, including but not limited to having both seat support structure 16, 16A coupled to the beam 400. The second seat support structure 16A may be formed of the same materials, shape, and components as the seat support structure 16, or may be formed of different materials, shapes, and/or components as needed to achieve a suitable structural stability and stiffness that will withstand warpage effects when the two passenger seats 20 and the monument 26 are coupled to the base frame assembly 10, and the base frame assembly 10 is coupled to the seat tracks 22, 24.

By using the box frame 402 and the beams 400, 404, such a design would limit the frame size, thereby reducing weight and costs, and would provide a large area below the seat 20 to place all boxes (such as in-flight entertainment components, etc.) within easy access. The single box frame 402 may be used for all configurations and attachments to the beams 400, 404, thereby also simplifying production. In some embodiments, it will be necessary to ensure that the box frame 402 design is sufficiently rigid, particularly to avoid warpage effects when the passenger seat 20 and the monument 26 are coupled to the base frame assembly 10, and the base frame assembly 10 is coupled to the seat tracks 22, 24. Also, multiple kinematic fittings may be required for specific seat installation configurations.

According to any of the above embodiments, the secondary frame 14 may be positioned adjacent the seat support structure 16 and coupled to a portion of the lateral support structure 18 via a pivot coupling 36, as shown in FIG. 1. In certain embodiments, the secondary frame 14 is configured to be positioned below at least a substantial portion of a footrest 38. The secondary frame 14 further comprises at least one seat fitting 50 that is positioned in any suitable location along the surface of the secondary frame that aligns with the location of one of the seat tracks 22, 24. The seat fitting 50 may be attached to the secondary frame 14 via rivets, screws, or other suitable mechanical or chemical fasteners. The seat fitting 50 is then attached to one of the seat tracks 22, 24 via studs 32.

The pivot coupling 36 is oriented generally perpendicular to the central axis of the seat tracks 22, 24 and generally parallel to a plane crossing the seat tracks 22, 24. The orientation of the pivot coupling 36 effectively locks the secondary frame 14 to the main frame 12 when the base frame assembly 10 coupled to the seat tracks 22, 24. One of ordinary skill in the relevant art will understand that any suitable coupling arrangement between the main frame 12 and the secondary frame 14 may be used as needed to achieve a suitable structural stability and stiffness that will withstand warpage effects when the passenger seat 20 and the monument 26 are coupled to the base frame assembly 10, and the base frame assembly 10 is coupled to the seat tracks 22, 24.

Figure 21:
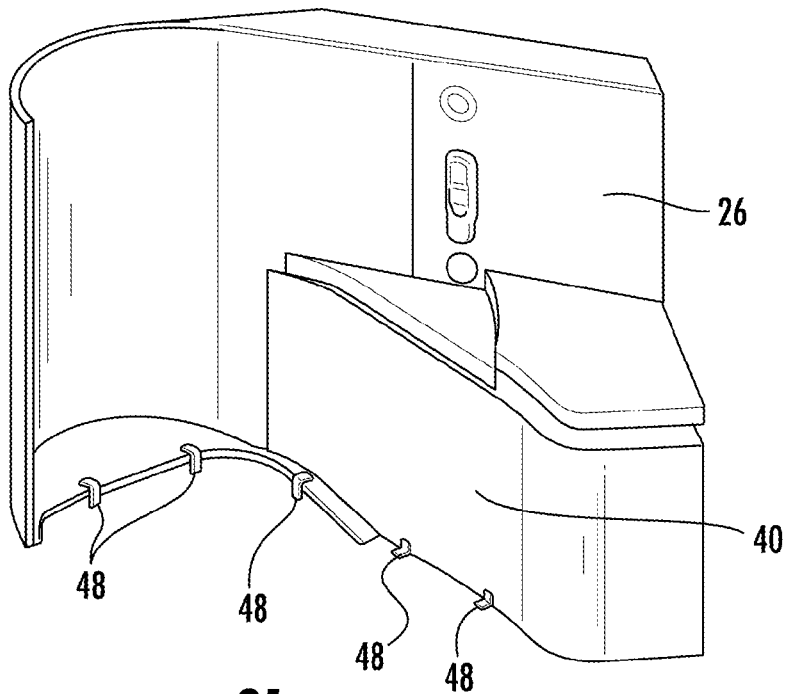
FIG. 21 is a perspective view of an upper part of a passenger seat module with the base frame assembly of FIG. 1, according to certain embodiments of the present invention.
Figure 22:
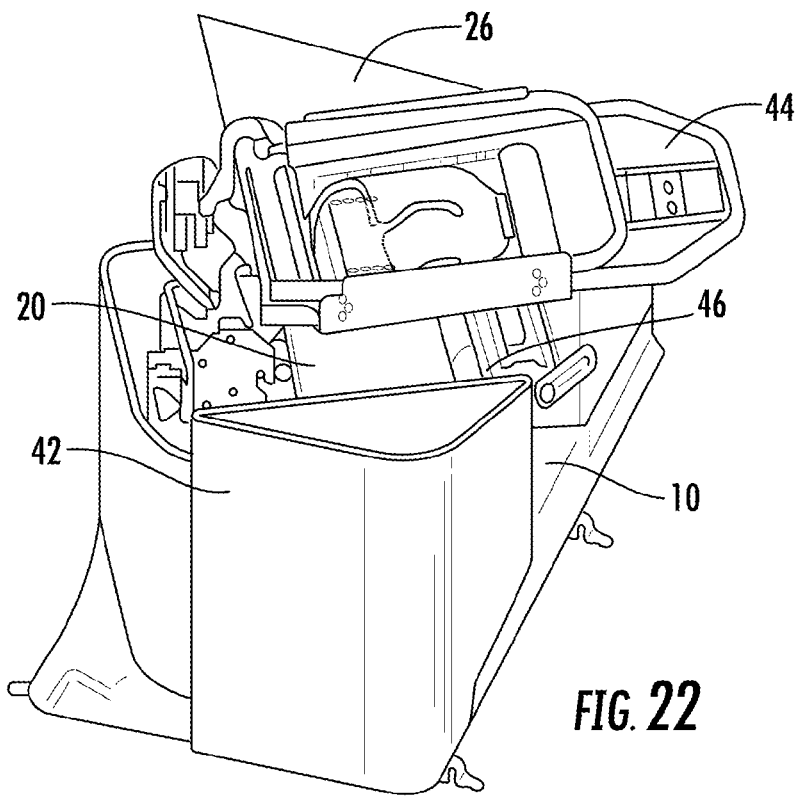
FIG. 22 is a perspective view of a lower part of a passenger seat module with the base frame assembly of FIG. 1, according to certain embodiments of the present invention.
Figure 23:
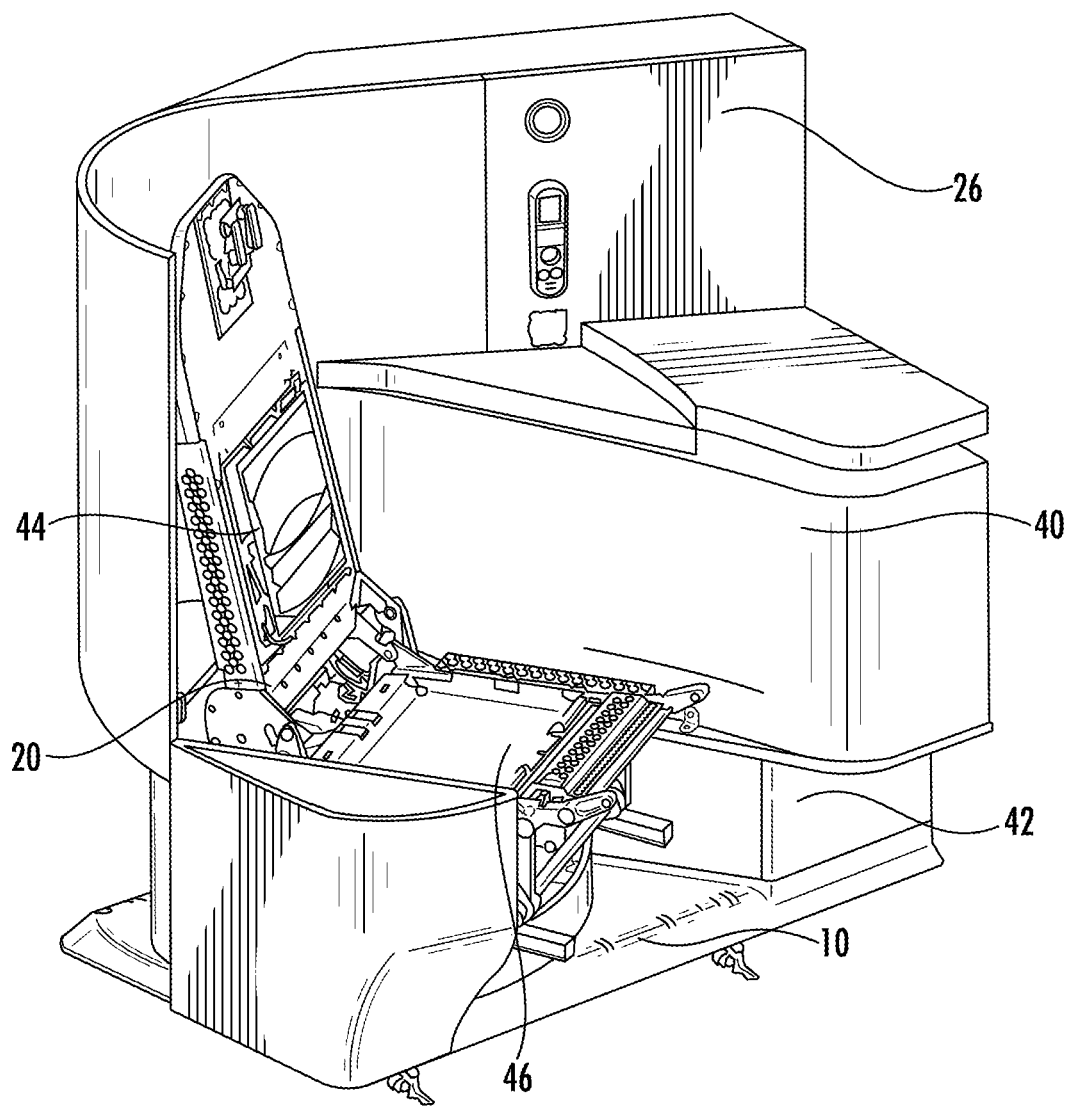
FIG. 23 is a perspective view of the combined upper part the passenger seat module of FIG. 21 and the lower part of the passenger seat module of FIG. 22.

According to any of the above embodiments, a passenger seat module comprising the passenger seat 20, the surrounding monument 26, and the base frame assembly 10 may be subdivided into an upper part 40 and a lower part 42, as illustrated in FIGS. 21-23. In these embodiments, the upper part 40 comprises a portion of the monument 26 that is configured to be positioned proximate a back 44 of the passenger seat 20. The lower part 42 comprises the passenger seat 20, the base frame assembly 10, and the portion of the monument 26 that is configured to be positioned proximate a lower portion 46 of the passenger seat 20. In certain embodiments, the monument 26 may be divided horizontally at a height that is approximately 20-25 inches from the cabin floor. As shown in FIG. 22, the back 44 of the passenger seat 20 folds down to minimize the height of the lower part 42. To assemble the upper part 40 to the lower part 42, the upper part 40 comprises a plurality of coupling projections 48 that are configured to couple to corresponding coupling receptacles on the lower part 42.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A base frame assembly comprising: (a) a pair of spars, each spar comprising a plurality of apertures, a channel, and a pair of recesses; (b) a panel comprising opposing sides, wherein each side is configured to fit within the channel of each spar; (c) a first beam inserted within a first recess of the pair of recesses of each spar; and (d) a second beam inserted within a second recess of the pair of recesses of each spar; wherein the first beam is configured to have a length that approximates a combined width of a passenger seat and a surrounding monument, and the second beam is configured to have a length that approximates a width of the passenger seat.

2. The base frame assembly of claim 1, wherein each spar is coupled to the first beam and the second beam with a bridge mounting configuration.

3. The base frame assembly of claim 1, further comprising a plurality of furniture fittings coupled to the first beam and the second beam, wherein each furniture fitting is configured to couple to the surrounding monument.

4. The base frame assembly of claim 1, further comprising a passenger seat and a surrounding monument mounted to the base frame assembly.

5. A base frame assembly comprising: (a) a beam comprising a rectilinear circumferential shape; (b) at least one seat fitting comprising a structure fitting coupled to a portion of a lower half of the beam; (c) at least one furniture fitting comprising the structure fitting coupled to a portion of an upper half of the beam; and (d) a panel comprising a plurality of the structure fittings coupled to a portion of the upper half of the beam; wherein each structure fitting is configured to have an inner shape that substantially conforms to no more than one-half of the rectilinear circumferential shape of the beam so that the structure fittings coupled to the portion of the upper half of the beam do not overlap with the structure fittings coupled to the portion of the lower half of the beam.

6. The base frame assembly of claim 5, further comprising a second beam, wherein the beam is a first beam configured to have a length that approximates a combined width of a passenger seat and a surrounding monument, and the second beam is configured to have a length that approximates a width of the passenger seat.

7. The base frame assembly of claim 5, further comprising a passenger seat and a surrounding monument mounted to the base frame assembly.

\* \* \* \* \*